United States Patent
Chan et al.

(10) Patent No.: US 9,246,747 B2
(45) Date of Patent: Jan. 26, 2016

(54) ADAPTIVE UNIFIED PERFORMANCE MANAGEMENT (AUPM) WITH ROOT CAUSE AND/OR SEVERITY ANALYSIS FOR BROADBAND WIRELESS ACCESS NETWORKS

(71) Applicant: Hong Kong Applied Science and Technology Research Institute Co., Ltd., Shatin, New Territories (CN)

(72) Inventors: Siu Ping Chan, Kornhill (CN); Ka Ho Mui, Wong Tai Sing (CN); Xiaodong Wang, Shen Zen (CN); Chun Sing Joseph Chan, Hong Kong (CN); Shenglong Xiao, Shen Zhen (CN); Hua Xia, Shen Zen (CN); Qinghua Liao, Shenzhen (CN)

(73) Assignee: Hong Kong Applied Science and Technology Research Co., Ltd., Shatin (HK)

( * ) Notice: Subject to any disclaimer, the term of this patent is extended or adjusted under 35 U.S.C. 154(b) by 194 days.

(21) Appl. No.: 13/678,362

(22) Filed: Nov. 15, 2012

(65) Prior Publication Data
US 2014/0136685 A1  May 15, 2014

(51) Int. Cl.
G06F 15/173 (2006.01)
H04L 12/24 (2006.01)
H04L 12/26 (2006.01)

(52) U.S. Cl.
CPC .......... *H04L 41/022* (2013.01); *H04L 41/0636* (2013.01); *H04L 41/142* (2013.01)

(58) Field of Classification Search
CPC ..... H04W 4/00; H04L 43/00; H04L 12/2602; H04L 41/12
USPC .......................... 709/224, 340, 370, 702, 714
See application file for complete search history.

(56) References Cited

U.S. PATENT DOCUMENTS 6,421,467 B1 * 7/2002 Mitra .................... G06K 9/6222
                                                                382/240
6,707,795 B1 * 3/2004 Noorhosseini ...... H04L 41/0631
                                                                370/242

(Continued)

FOREIGN PATENT DOCUMENTS

CN        101719849 A    6/2010
CN        102209958 A    10/2011

OTHER PUBLICATIONS

Al-Mamory et. al., Intrusion detection alarms reduction using root cause analysis and clustering, Nov. 21, 2008, Computer Communication 32 (2009), pp. 419-430.*

*Primary Examiner* — Kevin Bates
*Assistant Examiner* — Golam Mahmud
(74) *Attorney, Agent, or Firm* — Norton Rose Fulbright US LLP (57) ABSTRACT

Systems and methods which provide an adaptive unified performance management (AUPM) framework for interacting with disparate network elements using techniques adaptive to operational conditions to provide network performance adaptive root cause analysis (ARCA) are shown. An AUPM framework of embodiments of the invention implements a proxy based architecture in which a plurality of proxies are utilized to connect to and perform data communication with the disparate network elements. Centralized performance management is in communication with the proxies to obtain and unify network element data for performance monitoring, alarm reporting, and/or root cause analysis. The performance monitoring, alarm reporting, and root cause analysis provided by centralized performance management of embodiments herein implements adaptive cluster-based analysis to provide robust operation adapted to accommodate various operational scenarios, such as may include time varying conditions and learning based configuration.

17 Claims, 6 Drawing Sheets

(56) References Cited

U.S. PATENT DOCUMENTS

| | | | |
|---|---|---|---|
| 7,076,695 B2 * | 7/2006 | McGee | G06F 11/0709 702/179 |
| 7,092,707 B2 | 8/2006 | Lau et al. | |
| 7,103,504 B1 * | 9/2006 | McGlaughlin | G06F 11/0709 702/182 |
| 7,143,153 B1 * | 11/2006 | Black | H04L 41/0681 709/220 |
| 7,519,860 B2 * | 4/2009 | Hatonen | G06K 9/6284 714/26 |
| 7,600,160 B1 * | 10/2009 | Lovy | G06F 11/3495 714/47.2 |
| 7,606,895 B1 * | 10/2009 | Dini | H04L 12/14 709/223 |
| 7,779,101 B1 * | 8/2010 | Zahavi | G06F 15/173 709/203 |
| 7,855,977 B2 * | 12/2010 | Morrison | H04L 41/0681 370/252 |
| 7,936,694 B2 | 5/2011 | Choudhury | |
| 7,986,632 B2 * | 7/2011 | Monaco | H04L 43/022 370/231 |
| 8,090,676 B2 * | 1/2012 | Patel | G05B 23/024 700/108 |
| 8,385,662 B1 * | 2/2013 | Yoon | G06K 9/6247 382/156 |
| 8,538,897 B2 * | 9/2013 | Han | G06F 11/079 706/12 |
| 8,660,370 B1 * | 2/2014 | Yoon | G06K 9/6247 382/116 |
| 9,003,010 B1 * | 4/2015 | Saparoff | G06F 21/552 370/224 |
| 2003/0065986 A1 * | 4/2003 | Fraenkel | G06F 11/3006 714/47.2 |
| 2003/0079160 A1 | 4/2003 | McGee et al. | |
| 2003/0225876 A1 * | 12/2003 | Oliver | H04L 41/22 709/224 |
| 2005/0219151 A1 * | 10/2005 | Li | H04L 12/2602 345/7 |
| 2006/0178898 A1 * | 8/2006 | Habibi | G06Q 10/10 705/1.1 |
| 2008/0170579 A1 * | 7/2008 | Chafle | H04L 12/5695 370/401 |
| 2009/0122697 A1 * | 5/2009 | Madhyasha | H04L 12/2697 370/229 |
| 2011/0141914 A1 * | 6/2011 | Yang | H04L 49/555 370/242 |
| 2012/0143795 A1 | 6/2012 | Han et al. | |
| 2013/0157708 A1 * | 6/2013 | Economy | H04W 48/18 455/518 |
| 2014/0037214 A1 * | 2/2014 | Deolalikar | G06K 9/00442 382/197 |

* cited by examiner

*FIG. 7B*

ADAPTIVE UNIFIED PERFORMANCE MANAGEMENT (AUPM) WITH ROOT CAUSE AND/OR SEVERITY ANALYSIS FOR BROADBAND WIRELESS ACCESS NETWORKS

TECHNICAL FIELD

The invention relates generally to network systems and, more particularly, to adaptive unified performance management of network elements.

BACKGROUND OF THE INVENTION

Many forms of network systems, using wireless and/or wireline communication links provided by various networks, are in widespread use today. In particular, network systems are commonly used to facilitate communication of data, voice, images, and/or other information (collectively referred to herein as data communication) between individuals and/or devices (e.g., computers, mobile telephones, personal digital assistants (PDAs), tablet devices, network appliances, etc.). The network communication links may be provided by various network configurations, such as the public switched telephone network (PSTN), cellular telephony networks, cable transmission networks, personal area networks (PANs), local area networks (LANs), metropolitan area networks (MANs), wide area networks (WANs), the Internet, etc., and combinations thereof.

The infrastructure deployed to provide network configurations facilitating data communication may present significant challenges with respect to its management. For example, a typical broadband wireless access (BWA) network, in which various mobile processor-based devices such as computers, smart phones, and PDAs are provided broadband data communication, often include a large number of geographically dispersed network elements (e.g., base stations, access points, mobility management entities, gateways, routers, switches, etc.) which are generally supplied by different manufacturers. Although the various manufacturers may provide a centralized means by which operational data may be collected from their respective network elements for analysis and management of those network elements by a network operator, different ones of such network element management means are generally required for managing the network elements from the different manufacturers. That is, the network element management means have heretofore not provided a performance management solution which is unified with respect to all, or a significant number, of the different network elements (i.e., network elements from different manufacturers or otherwise providing different or proprietary management data interfaces).

In addition to failing to provide a unified performance management solution, the network element management means available today typically provide a relatively simple alarm condition type model. For example, many vendor's network element management solutions provide fixed thresholds for use with respect to monitored parameters, wherein if a monitored parameter is determined to have crossed the corresponding threshold an associated alarm condition is initiated. The use of such fixed thresholds fails to provide adaptability to time varying conditions, such as the time varying environment and channel conditions often experienced with respect to wireless communication links. Moreover, the alarms initiated through the use of such thresholds provide notification of an network operational symptom, but fail to provide any indication of the root cause of the issue. Accordingly, network management personnel is left to work with multiple different network element management means, and any alarm messages regarding their respective network elements, to puzzle together a view of the network operation and management its performance.

BRIEF SUMMARY OF THE INVENTION

The present invention is directed to systems and methods which provide an adaptive unified performance management (AUPM) framework for interacting with disparate network elements (e.g., network elements from different manufacturers, network elements having different or proprietary management data interfaces, etc.) using techniques adaptive to operational conditions (e.g., time varying conditions) to provide network performance adaptive root cause analysis (ARCA). An AUPM framework of embodiments of the invention implements a proxy based architecture in which a plurality of proxies are utilized to connect to and perform data communication with the disparate network elements. Centralized performance management is in communication with the proxies to obtain and unify network element data for performance monitoring, alarm reporting, and/or root cause analysis. The performance monitoring, alarm reporting, and root cause analysis provided by centralized performance management of embodiments herein implements adaptive analysis to provide robust operation adapted to accommodate various operational scenarios, such as may include time varying conditions and learning based configuration.

The architecture of an AUPM framework of embodiments of the invention comprises a multi-layer data collection, aggregation, and analysis configuration. For example, the multi-layer configuration of embodiments includes a multiple network element (MNE) data extractor layer, a performance monitoring layer, and an ARCA layer. At least a portion of the MNE data extractor layer is implemented by the aforementioned proxies according to embodiments of the invention. The performance monitoring layer and ARCA layer, as well as possibly a portion of the MNE data extractor layer, is implemented by the aforementioned centralized performance management according to embodiments of the invention.

The MNE data extractor layer of embodiments implements a data collection engine to interact and provide data communication with disparate network elements. The MNE data extractor layer preferably processes the data associated with the disparate network elements as collected by the data collection engine to provide one or more common data model, as may be utilized for different performance monitoring applications provided by the AUPM framework.

The performance monitoring layer of embodiments operates to query and correlate data as provided by the MNE data extractor layer in order to provide end-to-end network performance monitoring. The performance monitoring layer preferably accesses and analyzes data from the aforementioned common data models for use in performance management operation, such as alarm reporting, root cause analysis, etc. For example, the performance monitoring layer of embodiments may process data obtained from the various network elements to generate feature vectors indicative of the performance of particular aspects of the network (e.g., interference feature vector, coverage hole feature vector, network congestion feature vector, etc.).

The ARCA layer of embodiments operates with respect to data provided by the performance monitoring layer to analyze aspects of network performance and provide root cause and/or severity information. For example, an ARCA layer of embodiments herein implements cluster-based analysis techniques to determine the root cause and/or severity of various aspects of network performance, such as through analysis of the aforementioned feature vectors. The analysis techniques implemented by an ARCA layer of embodiments of the invention are adaptive to operational conditions, such as through the use of adaptive centroid cluster-based analysis techniques, to provide robust analysis and performance management.

It should be appreciated that the multi-layer configuration of the AUPM framework of embodiments herein may include functionality (whether provided in additional/alternative layers and/or provided by one or more of the aforementioned layers) in addition to or in the alternative to the foregoing. For example, an AUPM framework multi-layer configuration may include alarm reporting functionality, such as within the ARCA layer or in addition thereto.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
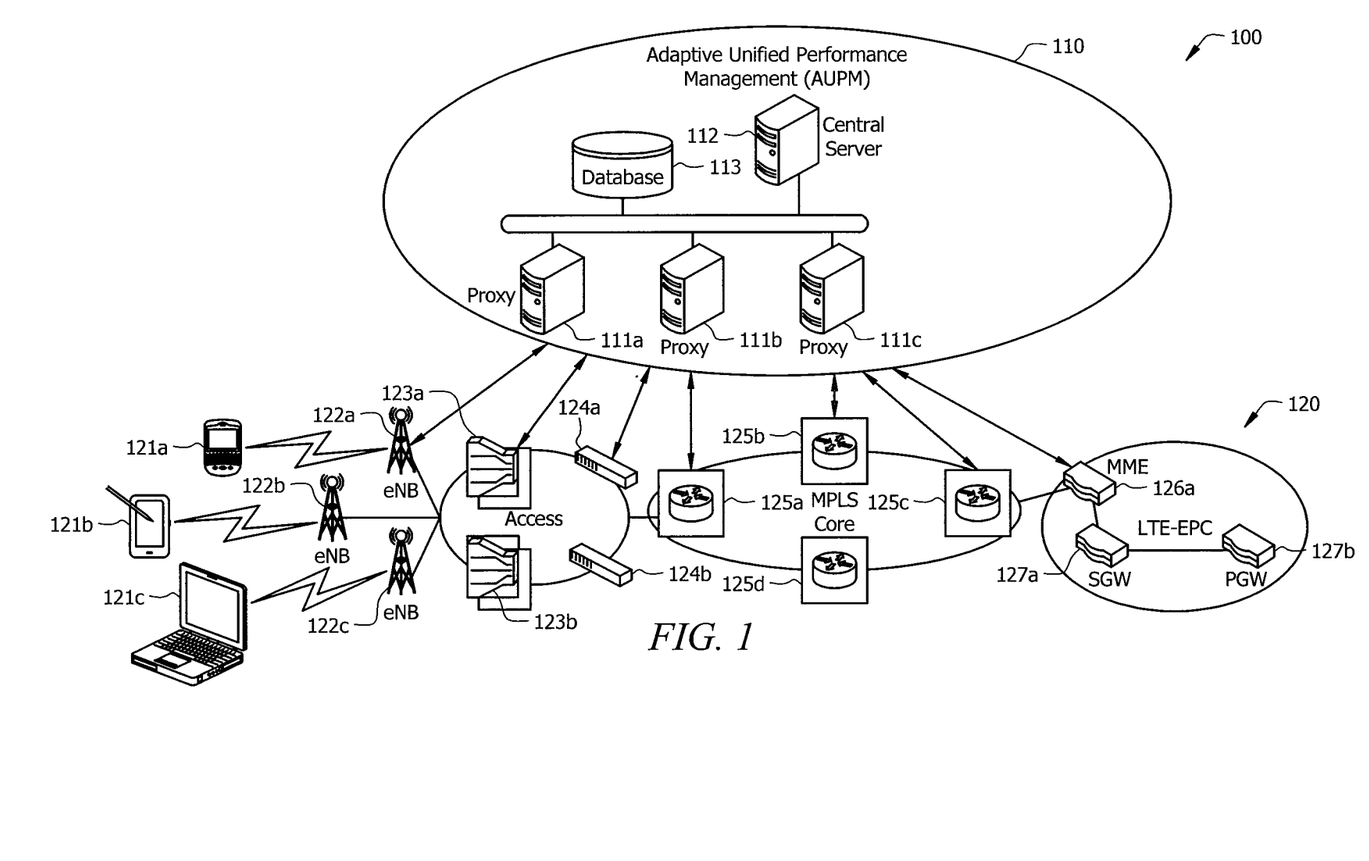
FIG. 1 shows a system in which an adaptive unified performance management (AUPM) framework is coupled to network infrastructure to provide performance management in accordance with embodiments of the invention.

FIG. 1 shows system 100 in which adaptive unified performance management (AUPM) framework 110 of embodiments of the invention is coupled to network infrastructure 120 to provide performance management in accordance with the concepts herein. Network infrastructure 120 may provide various network configurations, such as the PSTN, cellular telephony networks, cable transmission networks, PANs, LANs, MANs, WANs, the Internet, etc., and combinations thereof, and may utilize wireless and/or wireline links in providing network communication. As one example, a network provided by network infrastructure 120 may comprise a broadband wireless access (BWA) network operable to provide broadband wireless data communication with respect to a plurality of mobile and other terminals (e.g., user devices 121a-121c, such as may comprise computers, smart phones, PDAs, tablet devices, network appliances, etc.).

Network infrastructure 120 of the illustrated embodiment is comprised of various network elements, such as may provide different forms of network connectivity (e.g., cellular communication infrastructure, Internet protocol (IP) network infrastructure, wireless IP network infrastructure, etc.) and/or different connectivity functionality (e.g., gateways, routers, switches, access points, base stations, etc.). For example, base stations 122a-122c (e.g., enhanced node Bs), serving gateways (SGWs) 123a-123b, and routers 124a-124b may comprise a part of an access network portion (e.g., cellular network), routers 125a-125d (e.g., multiprotocol label switching (MPLS) routers) may comprise a part of a backbone network portion (e.g. backhaul network), and control node 126a (e.g., mobile management entity) and gateways 127a-127b (e.g., SGW, packet data network gateway (PGW), etc.) may comprise part of a packet core network portion (e.g., long term evolution (LTE) evolved packet core (EPC) network). In operation, the network elements of these various network portions may, for example, cooperate to provide a BWA network configuration for delivering broadband network communication to various terminals, such as user devices 121a-121c.

The presence of such various different forms of network infrastructure presents a challenge with respect to performance management due to differences in the infrastructure functionality and operation. Moreover, in addition to the network infrastructure comprising different forms of network connectivity and/or different connectivity functionality, the network elements may be manufactured by different manufacturers, thereby utilizing different (e.g., proprietary) data interfaces etc. Thus, unified collection and utilization of data from the various network elements of network infrastructure 120 is generally not natively supported, making end-to-end monitoring and performance management of the network difficult.

AUPM framework 110 of the illustrated embodiment comprises a proxy based architecture adapted to interact with the disparate network elements (e.g., network elements from different manufacturers, network elements having different or proprietary management data interfaces, etc.) of network infrastructure 120 to facilitate unified collection and utilization of network element data for network monitoring and performance management. Accordingly, the illustrated embodiment of AUPM framework 110 implements a proxy based architecture in which proxy servers 111a-111c are in communication with corresponding network elements of network infrastructure 120. Proxy servers 111a-111c of embodiments are utilized to connect to and perform data communication with associated ones of the disparate network elements of network infrastructure 120. It should be appreciated that communication between a proxy server and network elements associated therewith may be provided using network links via one or more other network elements of network infrastructure 120 not otherwise associated with the particular proxy server for which communication is provided. Centralized performance management server 112, which is in communication with proxy servers 111a-111c, is utilized to obtain and unify network element data from the proxy servers to provide performance monitoring, alarm reporting, and/or root cause analysis according to embodiments.

It should be appreciated that AUPM framework 110 may include infrastructure in addition to or in the alternative to the aforementioned proxy servers and centralized performance management server. For example, AUPM framework 110 of embodiments includes one or more database (e.g., database 113 in the illustrated embodiment), such as may be utilized by proxy servers 111a-111c to store data collection profiles, network element data, etc. and/or by centralized performance management server 112 to store common data models, feature vector data, root cause analysis data, etc. Although database 113 is illustrated as being provided external to proxy servers 111a-111c and centralized performance management server 112, such databases may be provided internal to any or all such servers and/or other systems of AUPM framework 110 according to embodiments.

Proxy servers 111a-111c, centralized performance management server 112, and database 113 of embodiments may comprise processor-based systems operable under the control of an instruction set (e.g., software, firmware, etc.) to provide operation as described herein. Such processor-based systems may comprise a general purpose processor-based system (e.g., a computer system based upon the Intel CORE family of processors) having appropriate memory (e.g., random access memory (RAM), read only memory (ROM), magnetic disk memory, optical disk memory, flash memory, etc.) and input/output (e.g., network interface card (NIC), keyboard, digitizer, display, audio generator, printer, etc.) for performing the functions described herein. Additionally or alternatively, such processor-based systems may comprise a special purpose processor-based system (e.g., a system based upon an application specific integrated circuit (ASIC), field programmable gate array (FPGA), etc.) having the requisite peripheral circuitry (e.g., memory, input/output, etc.) for performing the functions described herein. Elements of the present invention may thus comprise program or code segments to perform the tasks described herein. The program or code segments can be stored in a processor-readable or computer-readable medium, such as the aforementioned RAM, ROM, magnetic disk memory, optical disk memory, flash memory, etc.

Proxy servers 111a-111c of embodiments of AUPM framework 110 are each adapted to interact with particular network element types or configurations of the disparate network elements found in network infrastructure 120 to facilitate the collection and utilization of network element data. For example, proxy server 111a may implement one or more network element data model and data collection profile compatible with a first subset of network elements (e.g., network elements from a same manufacturer, network elements implementing a same data interface, network elements implementing a same communication protocol, etc.), such as may comprise user devices 121a-121c, base stations 122a-122c, and serving gateways 123a-123b, in order to connect to and perform data communication with this subset of network infrastructure 120 network elements. Correspondingly, proxy server 111b may implement one or more network element data model and data collection profile compatible with a second subset of network elements, such as may comprise routers 124a-124b and routers 125a-125d, in order to connect to and perform data communication with this subset of network infrastructure 120 network elements. Similarly, proxy server 111c may implement one or more network element data model and data collection profile compatible with a third subset of network elements such as routers 125a-125d, control node 126a, and gateways 127a-127b, in order to connect to and perform data communication with this subset of network infrastructure 120 network elements.

It should be appreciated that proxies implemented according to embodiments of the invention may provide communication with all or less than all of any particular network element subset. For example, a proxy server providing communication with respect to a particular type of or a particular manufacturer's network elements need not communicate with all instances of such network elements in the network infrastructure. Scaling is readily accommodated through the use of a plurality of proxy servers, each in communication with a portion of a particular type of or a particular manufacturer's network elements, where a large number of such network elements are present in the network infrastructure. Moreover, as can be appreciated from the foregoing and the illustrated embodiment, a plurality of proxies implemented according to embodiments of the invention may provide communication with a particular network element subset. For example, a plurality of proxy servers may provide communication with respect to network elements of a particular type or from a particular manufacturer. Moreover, a plurality of proxy servers may provide communication with respect to a same network element (e.g., proxy servers implementing different data collection profiles may each communicate with a same network element) according to embodiments herein.

In operation, proxies implemented according to embodiments of the invention are adapted to communicate with an associated subset of network elements to obtain network element data therefrom, to store the network element data, to aggregate network element data, etc. For example, proxy servers 111a-111c of the illustrated embodiment may be in communication with associated subsets of the network elements of network infrastructure 120 to receive various information reported by the network elements and/or to query or otherwise harvest various information from the network elements, wherein such network information received and/or queried may comprise periodic or aperiodic performance reports, alarm messages, status reports, etc. Moreover, proxies implemented according to embodiments of the invention are adapted to communicate with an associated subset of network elements to provide information to the network elements. For example, proxy servers 111a-111c of the illustrated embodiment may be in communication with associated subsets of network elements of network infrastructure 120 to provide various information to the network elements, wherein such information may comprise control commands, configuration settings, network element data, etc.

Centralized performance management server 112 of embodiments of AUPM framework 110 is adapted to communicate with the proxies to obtain and unify network element data from the proxy servers to provide performance monitoring, alarm reporting, and/or root cause analysis according to embodiments. For example, centralized performance management server 112 of the illustrated embodiment may communicate with proxy servers 111a-111c to gather appropriate network element data and generate common data models from the network element data of disparate network elements. Centralized performance management server 112 may operate to analyze the data of the common data models to provide performance monitoring, alarm reporting, and root cause analysis functionality. The performance monitoring, alarm reporting, and root cause analysis provided by centralized performance management server 112 of embodiments implements adaptive analysis to provide robust operation adapted to accommodate various operational scenarios, such as may include time varying conditions and learning based configuration. Moreover, centralized performance management server 112 of embodiments herein is adapted to communicate with the proxies to provide information to be communicated to the network elements. For example, centralized performance management server 112 may provide various information to the network element through proxy servers 111a-111c, wherein such information may comprise control commands, configuration settings, network element data, etc.

Figure 2:
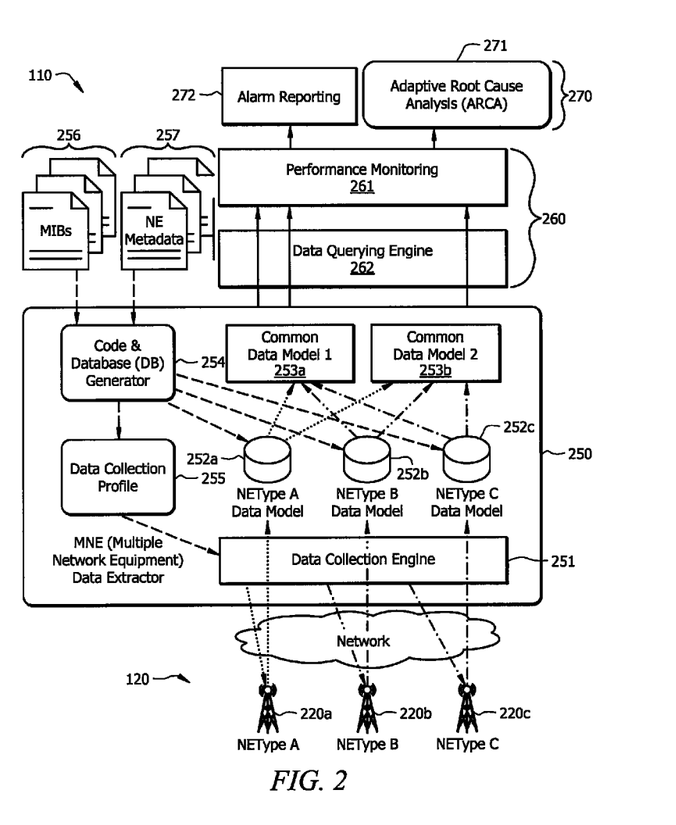
FIG. 2 shows a multi-layer data collection, aggregation, and analysis configuration of embodiments of the AUPM framework of FIG. 1.

FIG. 2 shows a multi-layer data collection, aggregation, and analysis configuration of embodiments of AUPM framework 110. The multi-layer architecture of the embodiment illustrated in FIG. 2 includes multiple network equipment (MNE) data extractor layer 250, performance monitoring layer 260, and adaptive root cause analysis (ARCA) layer 270. In embodiments of the present invention, a portion of MNE data extractor layer 250 is implemented by proxy servers 111a-111c (e.g., as computer executable code operable upon processor-based proxy server systems) while a portion of MNE data extractor layer 250, performance monitoring layer 260, and ARCA layer 270 are implemented by centralized performance management server 112 (e.g., as computer executable code operable upon a processor-based performance management server system). It should be appreciated that data models 252a-252c and common data models 253a-253b of the illustrated embodiment may be stored in one or more database, such as database 113 of FIG. 1, a database of one or more of proxy servers 111a-111c, a database of centralized performance management server 112, etc.

The various layers of the multi-layer architecture of the illustrated embodiment of AUPM framework 110 cooperate to interact with disparate network elements, represented here as network elements 220a-220c, using techniques adaptive to operational conditions (e.g., time varying conditions) to provide network performance adaptive root cause analysis operation. It should be appreciated that network elements 220a-220c shown in FIG. 2 comprise network elements from different manufacturers, network elements having different or proprietary management data interfaces, etc. (i.e., disparate network elements), and thus may correspond to any or all of the network elements of FIG. 1 (e.g., user devices 121a-121c, base stations 122a-122c, routers 124a-124b, routers 125a-125d, control node 126a, and/or gateways 127a-127b).

MNE data extractor layer 250 of embodiments implements data collection engine 251 operable to interact and provide data communication with the disparate network elements. In operation, MNE data extractor layer 250 of embodiments processes the data associated with the disparate network elements to provide one or more common data model, shown here as common data models 253a-253b. The common data models provided by MNE data extraction layer 250 may be utilized for different performance monitoring applications provided by performance monitoring layer 260 of AUPM framework 110.

To facilitate data collection engine 251 interacting and performing data communication with the disparate network elements, MNE data extractor layer 250 of the illustrated embodiment includes code and database generator 254, data collection profile 255, and data models 252a-252c. Code and database generator 254 of embodiments utilizes information specific to the particular network elements or network element groupings (e.g., network element types, network elements of a particular manufacturer, etc.), such as may be provided by management information bases (MIBs) 256 and network element metadata 257, to create data models specific to the particular network elements (e.g., data models 252a-252c) for which network element data is collected by data collection engine 251 in accordance with data collection profile 255 (also provided by code and database generator 254 of embodiments). Accordingly, code and database generator 254 may generate database schemas (e.g., data models 252a-252c) and data collection profiles (e.g., data collection profile 255) based on network element metadata and the MIBs.

MIBs 256, utilized according to embodiments, define the parameters that can be polled or otherwise obtained from and/or pushed or otherwise provided to corresponding ones of the network elements (e.g., a data format for defining the simple network management protocols (SNMP) protocols for the network elements). Network element metadata 257, utilized according to embodiments, comprises defined data to characterize the MIB characteristics, such as which parameters that are to be polled from particular network elements or network element groupings, for performance monitoring herein.

Code and database generator 254 of embodiments uses the foregoing MIBs and network element metadata to automatically generate the database schema and the data collection profile used to instruct data collection engine 251 how to collect the desired network element data. For example, the database schema generated may define any specific database of data models 252a-252c to comprise particular parameters etc. to be collected from the network elements for a particular performance monitoring task. A data collection profile of data collection profile 255 generated may define instructions operable to tell data collection engine 251 not only which parameters that are to be collected from the network elements, consistent with a corresponding database schema, but also in which data model and where within the data model the collected data is to be stored. Moreover, the instructions of a data collection profile generated according to embodiments herein may also define when or under what circumstances the data is to be collected (e.g., periodically, aperiodically, upon the occurrence of an event, etc.), as may be indicated in network element metadata 257.

The network element specific data stored in appropriate ones of data models 252a-252c by data collection engine 251 in accordance with instructions of data collection profile 255 can be further aggregated and transformed into non-vendor specific, non-network element type specific common data models. For example, MNE data extractor layer 250 preferably processes the data associated with the disparate network elements as collected by data collection engine 251 to provide one or more common data model (shown here as common data models 253a-253b), as may be utilized for different performance monitoring applications provided by AUPM framework 110. In operation according to embodiments of the invention, the data from the disparate network elements is transformed into a common data model by using the programmed mapping and transformation from network element specific data models into a generic representation with aggregation. The particular logic used in the programmed mapping and transformation of embodiments depends on the upper-layer performance monitoring requirements and needs. For example, if the latency is measured and used in millisecond (ms) units in upper-layer performance monitoring (e.g., in order to calculate other cost functions), then for those network elements which provide the values in microsecond (us) units may be transformed by mapping from microseconds (us) to milliseconds (ms). The resultant transformed data may then be stored into the common data model.

In operation according to embodiments, performance monitoring layer 260 queries (e.g., using data querying engine 262) and correlates or otherwise processes (e.g., using performance monitoring logic 261) network element data as provided by data collection engine 251 of MNE data extractor layer 250 in order to provide end-to-end network performance monitoring. Performance monitoring layer 260 preferably accesses and analyzes data from common data models 253a-253b for use in performance management operation, such as alarm reporting (e.g., as may be provided by alarm reporting logic 272), root cause analysis (e.g., as may be provided by ARCA logic 271), etc. For example, performance monitoring layer 260 of embodiments may process data obtained from the various network elements to generate feature vectors indicative of the performance of particular aspects of the network (e.g., interference feature vector, coverage hole feature vector, network congestion feature vector, etc.), as discussed in further detail below. The processing of data by performance monitoring logic 261 is preferably based on different performance monitoring applications (e.g., if data latency is to be measured, corresponding rules to aggregate the data and feature vectors for data latency may be utilized, if interference levels are to be measured, corresponding rules to aggregate the data and feature vectors for interference levels may be utilized, etc.). Accordingly, embodiments of performance monitoring logic 261 will implement different instructions as to how to aggregate the data and/or how to transform the data depending upon the performance monitoring function to be performed.

ARCA layer 270 of embodiments operates with respect to data provided by performance monitoring layer 260 to analyze aspects of network performance and provide root cause and/or severity information. For example, ARCA logic 271 may implement cluster-based analysis techniques to determine the root cause and/or severity of various aspects of network performance, such as through analysis of the aforementioned feature vectors, as discussed in further detail below. The analysis techniques implemented by ARCA layer 270 of embodiments of the invention are adaptive to operational conditions, such as through the use of adaptive centroid cluster-based analysis techniques, to provide robust analysis and performance management.

As can be seen in the embodiment illustrated in FIG. 2, the multi-layer configuration of AUPM framework 110 of embodiments herein may include functionality (whether provided in additional/alternative layers and/or provided by one or more of the aforementioned layers) in addition to or in the alternative to the foregoing. In particular, ARCA layer 270 of AUPM framework 110 of the illustrated embodiment includes alarm reporting functionality provided by alarm reporting logic 272.

Alarm reporting logic 272 of embodiments operates with respect to data provided by performance monitoring layer 260 to analyze aspects of network performance and provide alarm reporting (e.g., issuing of notifications, such as email alerts, short messaging service (SMS) alerts, IP protocol messages, display of alarm messages at a control console, etc.). Such alarm reporting may be based upon threshold analysis, such as may comprise comparing parameters or feature vectors provided by performance monitoring layer 260 to one or more alarm thresholds. Additionally or alternatively, such alarm reporting may implement adaptive analysis to provide robust operation adapted to accommodate various operational scenarios, such as may include time varying conditions and learning based configuration. For example, alarm reporting logic 272 of embodiments herein implements cluster-based analysis techniques to determine an alarm condition, such as through analysis of the aforementioned feature vectors.

To aid in understanding the adaptive analysis implemented according to embodiments of the invention, two wireless situations (i.e., high interference and coverage hole) will be utilized as examples herein. It should be appreciated that the concepts of the present invention are not limited to the particular number of performance parameters, the particular performance parameters, or the performance situations referenced in the examples given herein.

Figure 3A:
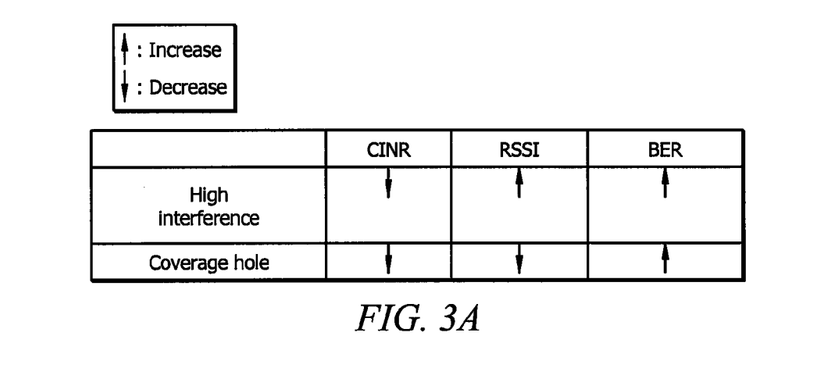
FIG. 3A shows performance parameter behavior associated with exemplary conditions.

Using radio frequency (RF) statistic and measurements, it can be observed that different performance metrics exhibit predictable performance behaviors in different wireless situations. For example, as shown in FIG. 3A, the aforementioned high interference situation may be accompanied by decreased carrier to interference and noise ratio (CINR), increased receive signal strength indicator (RSSI), and increased bit error rate (BER). Similarly, and also as shown in FIG. 3A, the aforementioned coverage hole situation may be accompanied by decreased CINR, decreased RSSI, and increased BER. Accordingly, the measurement of such performance metrics, such as by a network element operable as a wireless receiver (e.g., any of user devices 121a-121c and base stations 122a-122c of FIG. 1, etc.), may be utilized not only to detect the performance degradation (e.g., as may be useful in reporting an alarm condition), but to also to identify the root cause of the performance degradation (e.g., as may be useful in managing network elements to provide improved performance).

Figure 3B:
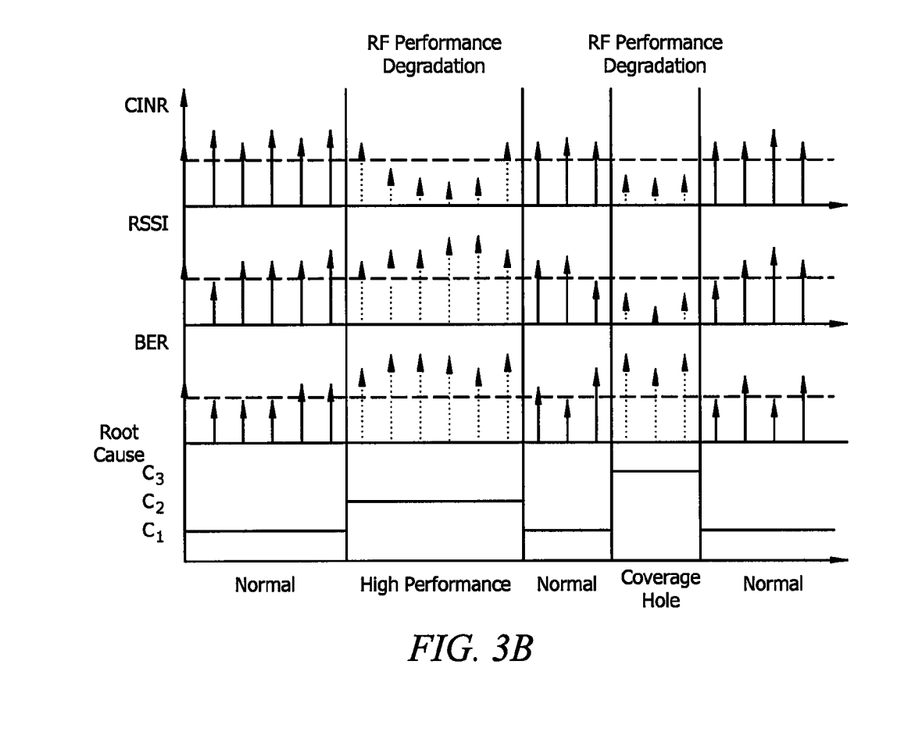
FIG. 3B shows a performance metric monitoring diagram illustrating the monitoring of exemplary performance parameters according to embodiments of the invention.

The performance metric monitoring diagram of FIG. 3B illustrates the monitoring of the aforementioned three performance metrics (i.e., CINR, RSSI, and BER) and the analysis of the behavior of the monitored performance metrics to provide performance degradation root cause analysis. For example, one or more of proxy servers 111a-111c may collect information regarding the three performance metrics from associated ones of the network elements of network infrastructure 120. The performance parameters as monitored using disparate ones of the network elements may be aggregated into a common data model (e.g., a common data model of common data models 253a-253b) and root cause analysis performed on the data by centralized performance management server 112.

Embodiments of the invention apply multi-dimensional K-means clustering in adaptive·analysis, such as for alarm condition determination and root cause analysis. For example, different clusters ($C_i$) may be defined as root causes or severity levels (e.g., $C_i=\{C_1, C_2, \ldots, C_K\}$, where K is the number of root causes or severity levels). Performance metrics ($M_i$) may be defined for the clusters (e.g., $M_i=\{M_1, M_2, \ldots, M_N\}$, where N is the number of metrics or dimensions, and metric values are normalized between 0 and 1). Feature vectors ($F_i$) may be defined from the performance metrics (e.g., $F_i=[M_{1i}, M_{2i}, \ldots, M_{Ni}]$) for determining associations between measured performance metrics and the clusters.

In implementing multi-dimensional K-means clustering according to embodiments of the invention, an initial centroid for each cluster is determined, such as using training values for the performance parameters providing the multi-dimensions. For example, a centroid may provide a mean, average, or other statistical representation of a plurality of multi-dimensional feature vectors representing the performance parameters (e.g., in the above example, the feature vectors would be three-dimensional vectors formed from the CINR, RSSI, and BER performance parameters). Accordingly, each such centroid and its associated cluster may represent a particular situation or condition.

For example, (referring to the feature vector cluster diagram of FIG. 4) centroid 411 may be initially determined from training information representing expected "normal" CINR, RSSI, and BER behavior (e.g., measurements, trends, etc.) for various network elements and thus cluster 410 may be defined around centroid 411 to identify feature vectors of subsequently monitored CINR, RSSI and BER performance parameters falling within cluster 410 as representative of "normal" performance. Centroid 421, on the other hand, may be initially determined from training information representing expected "high interference" CINR, RSSI, and BER behavior for various network elements and thus cluster 420 may be defined around centroid 421 to identify feature vectors of subsequently monitored CINR, RSSI, and BER performance parameters falling within cluster 420 as representative of "high interference" performance. Similarly, centroid 431 may be initially determined from training information representing expected "coverage hole" CINR, RSSI, and BER behavior for various network elements and thus cluster 430 may be defined around centroid 431 to identify feature vectors of subsequently monitored CINR, RSSI, and BER performance parameters falling within cluster 430 as representative of "coverage hole" performance.

As can be appreciated from the foregoing, in operation according to embodiments, training information with respect to the multi-dimensional feature vectors may be used to train the initial clusters. For example, initial centroid values may be computed for each situation or condition to be identified using multi-dimensional K-means clustering herein. Thereafter, a current measured feature vector (i.e., feature vector derived from appropriate monitored performance parameters) may be assigned to the "closest" cluster to determine the performance status and/or root cause. Referring again to FIG. 4, currently measured feature vector 401 (e.g., a multi-dimensional vector derived from CINR, RSSI, and BER behavior data collected by the AUPM framework) may, for example, be assigned to cluster 420 due to its proximity in the three-dimensional space, and thus root cause analysis may determine that high interference is present with respect to one or more network element. It should be appreciated that, although the foregoing example refers to assigning a currently measured feature vector to a nearest cluster, embodiments may implement cluster proximity thresholds and/or other metrics for assigning feature vectors to clusters. In such an embodiment, where a feature vector is determined not to be within a particular relative position with respect to any cluster, such a feature vector may not be assigned to an existing cluster. Embodiments may operate to initiate an alarm or error condition, may operate to define a new cluster, etc. upon the occurrence of such a situation.

Figure 4:
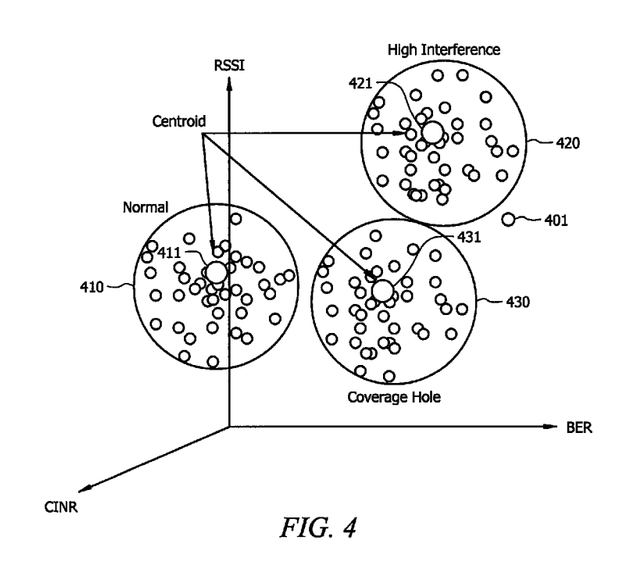
FIG. 4 shows a feature vector cluster diagram illustrating root cause analysis according to embodiments of the invention.

Embodiments of the invention implement adaptive techniques with respect to the foregoing cluster-based analysis techniques. Accordingly, in operation according to embodiments herein, the centroid of a cluster may be recomputed and updated each time a feature vector is assigned to the cluster. For example, continuing with the foregoing example in which currently measured feature vector 401 is assigned to cluster 420 due to its proximity thereto, centroid 421 of cluster 420 may be updated to include the influence of feature vector 401. Accordingly, the cluster-based analysis techniques used for determining particular situations or conditions (e.g., severity, root cause, etc.) are adaptive with respect to the network operation. Such cluster-based analysis techniques are thereby adaptive to operational conditions (e.g., time varying conditions) of the network.

Figure 5:
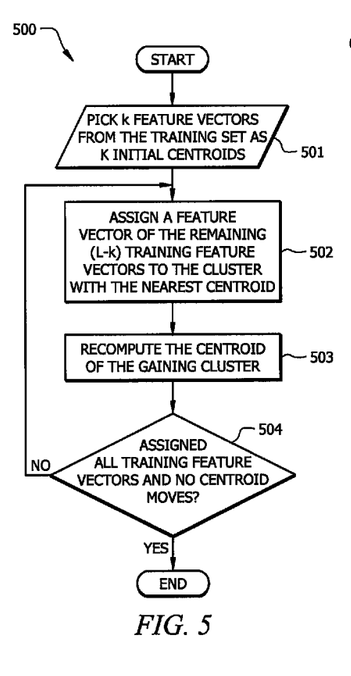
FIG. 5 shows a flow diagram for training operation to initially establish centroids of clusters representing particular situations or conditions according to embodiments of the invention.
Figure 6:
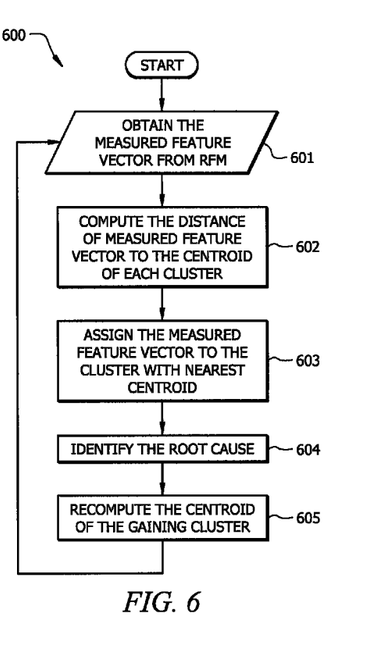
FIG. 6 shows a flow diagram for operation to provide root cause analysis using clusters.

FIGS. 5 and 6 show flow diagrams providing detail with respect to implementations of the foregoing adaptive cluster-based analysis techniques. In particular, FIG. 5 shows training operation to initially establish centroids of clusters representing particular situations or conditions and FIG. 6 shows operation to provide root cause analysis using such clusters. It should be appreciated that operation of flows 500 and 600, shown in FIGS. 5 and 6, may be provided by ARCA logic 271 of embodiments of the invention. The various feature vectors (e.g., as may be derived from the network element data collected by data collection engine 251 as provided in a common data model of common data models 253a-253b) may be provided to ARCA logic 271 by performance monitoring logic 261.

In operation of flow 500 of the training embodiment illustrated in FIG. 5, the first k feature vectors of a training set comprising L feature vectors are selected as K initial centroids (block 501). The feature vectors of the training set may comprise feature vectors derived from simulated and/or initial operation of the network infrastructure, captured from operation of a similar network deployment, etc. The first k feature vectors may be selected as those feature vectors of the training set expected to be representative of a particular situation or condition in the network for which performance monitoring is to be provided. A training feature vector of the remaining (L-k) feature vectors in the training set is selected and assigned to the cluster with the nearest centroid (block 502). After the assignment of a feature vector of the remaining feature vectors to a cluster, the illustrated embodiment operates to re-compute the centroid of the gaining cluster (bock 503). For example, the centroid may be recomputed as a function of a statistical (average, mean, weighted, etc.) combination of the feature vectors, or some subset thereof (e.g., using a time threshold with respect to when the data of the feature vectors was collected) to provide a centroid which is updated as feature vectors are determined to be associated with the associated cluster. A determination is made according to the illustrated embodiment regarding whether all training feature vectors have been assigned and no centroid continues to move when updated (block 504). If training feature vectors remain to be assigned or the updated centroids continue to move (e.g., more than some threshold amount of movement), processing according to the illustrated embodiment returns to assigning a training feature vector of the training set to the nearest centroid. If, however, no training feature vectors remain to be assigned and the updated centroids do not continue to move, the training embodiment of flow 500 illustrated in FIG. 5 is concluded.

In the foregoing example, it is assumed that the feature vectors obtained for the training set provide sufficient data to complete the training process (e.g., are able to obtain the centroids without further movement). However, in the situation where all training feature vectors have been assigned but a centroid continues to move, additional training features vectors may be obtained, and the training process continued until the centroids do not move further.

In operation of flow 600 of the root cause analysis embodiment illustrated in FIG. 6, a current measured feature vector is obtained (e.g., from performance monitoring logic 261)

(block 601). The distance of current measured feature vector is computed to the centroid of each cluster (block 602), according to the illustrated embodiment. The current measured feature vector is assigned to the cluster with the closest centroid (block 603). The root cause for the performance associated with the current measured feature vector may thus be determined from the cluster to which the feature vector was assigned (e.g., the cluster with the current measured feature vector assigned has been associated with a particular root cause, such as when the initial centroid was selected) (block 604). The centroid for the cluster to which the current measured feature vector was assigned is re-computed to thereby update the centroid based upon measured network operation (block 605). Processing according to the illustrated embodiment thereafter returns to obtain a new current measured feature vector.

It should be appreciated that the adaptive cluster-based analysis techniques implemented in the foregoing example are not limited to root cause analysis. Such adaptive cluster-based techniques may be utilized for various situation and/or condition analyses, such as severity analysis used with respect to alarm reporting. Accordingly, alarm reporting logic 272 of embodiments herein may implement adaptive cluster-based analysis techniques similar to those described above.

Figure 7A:
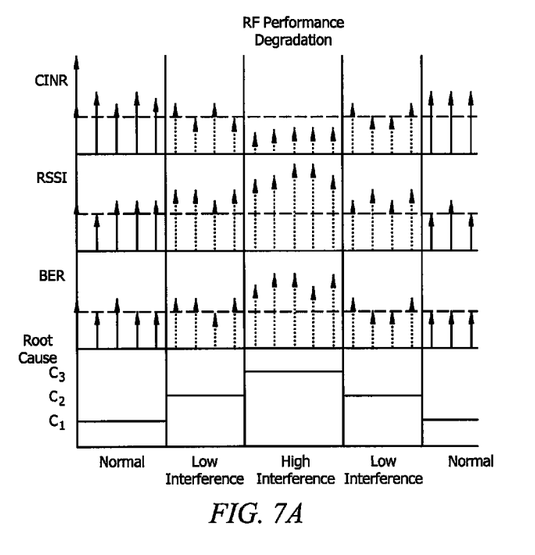
FIG. 7A shows a performance metric monitoring diagram illustrating the monitoring of exemplary performance parameters according to embodiments of the invention.
Figure 7B:
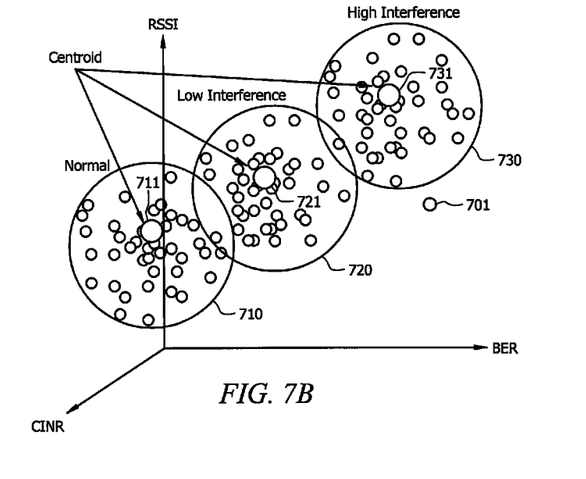
FIG. 7B shows a feature vector cluster diagram illustrating severity analysis according to embodiments of the invention.

Directing attention to FIGS. 7A and 7B, show a performance metric monitoring diagram (FIG. 7A) and corresponding feature vector cluster diagram (FIG. 7B) for providing severity analysis. As can be appreciated from the figures, the clusters of the feature vector cluster diagram of FIG. 7B are associated with a performance severity rather than a root cause, as were the clusters of the foregoing example.

The performance metric monitoring diagram of FIG. 7A illustrates the monitoring of three performance metrics (i.e., CINR, RSSI, and BER) and the analysis of the behavior of the monitored performance metrics to provide performance severity analysis. For example, one or more of proxy servers 111a-111c may collect information regarding the three performance metrics from associated ones of the network elements of network infrastructure 120. The performance parameters as monitored using disparate ones of the network elements may be aggregated into a common data model (e.g., a common data model of common data models 253a-253b) and severity analysis performed on the data by centralized performance management server 112. As can be appreciated from the performance metrics shown in FIG. 7A, a low interference situation may be accompanied by slightly decreased CINR, a slightly increased RSSI, and a slightly increased BER. Similarly, a high interference situation may be accompanied by significantly decreased CINR, a significantly increased RSSI, and a significantly increased BER. Accordingly, the measurement of such performance metrics, such as by a network element operable as a wireless receiver (e.g., any of user devices 121a-121c and base stations 122a-122c of FIG. 1, etc.), may be utilized to detect the severity of the performance degradation (e.g., as may be useful in reporting an alarm condition).

In providing severity analysis, each centroid and its associated cluster may represent a particular situation or condition representative of a performance severity. For example, (referring to the feature vector cluster diagram of FIG. 7B) centroid 711 may represent "normal" CINR, RSSI, and BER behavior (e.g., measurements, trends, etc.) for various network elements and thus cluster 710 may be defined around centroid 711 to identify feature vectors of subsequently monitored CINR, RSSI and BER performance parameters falling within cluster 710 as representative of "normal" performance. Centroid 721 may represent "low interference" CINR, RSSI, and BER behavior for various network elements and thus cluster 720 may be defined around centroid 721 to identify feature vectors of subsequently monitored CINR, RSSI, and BER performance parameters falling within cluster 720 as representative of "low interference" performance. Centroid 731, on the other hand, may represent "high interference" CINR, RSSI, and BER behavior for various network elements and thus cluster 730 may be defined around centroid 731 to identify feature vectors of subsequently monitored CINR, RSSI, and BER performance parameters falling within cluster 720 as representative of "high interference" performance.

It should be appreciated that, although embodiments have been described above with reference to particular performance parameters being monitored, particular numbers of performance parameters being used, particular numbers of clusters, particular situations or conditions being associated with the clusters, particular numbers of network element data models being used, particular numbers of common data models being generated, etc., such details are exemplary and are included to facilitate an understanding of the concepts herein without limitation of the invention. One having ordinary skill in the art will readily appreciate that the concepts herein are applicable to configurations other than those of the exemplary embodiments. For example, there is no limitation to the use of CINR, RSSI, and/or BER as performance parameters used in severity or root cause analysis. Likewise, there is no limitation to the use of three dimensions of performance parameters. The particular performance parameters utilized and the number of dimensions utilized may be selected based upon the particular situations or conditions to be monitored and analyzed. For example, where network congestion is to be monitored, performance parameters such as latency, jitter, and/or packet loss rate may be used.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   obtaining a plurality of performance metrics from a plurality of network elements of monitored network communication infrastructure of a broadband wireless access network, wherein the obtaining the plurality of performance metrics includes utilizing multiple network equipment (MNE) data extractor logic collecting network element-specific data using a plurality of different data models for different network elements of the plurality of network elements and generating a common data model from the network element-specific data of the plurality of different data models for a particular network-wide performance aspect to be monitored, wherein the generating the common data model includes transforming the network element-specific data into a network-wide generic representation adapted to support monitoring of the network-wide performance aspect of the monitored network communication infrastructure;

generating a feature vector using the common data model, wherein the feature vector represents the network-wide performance aspect of the network communication infrastructure to be monitored; and identifying at least one of a severity or a root cause of the network-wide performance aspect based on a distance of the feature vector to a centroid of a cluster of a plurality of clusters, wherein the cluster represents a root cause of the network-wide performance aspect to be monitored, and wherein the centroid of the cluster is updated using the feature vector generated from the common data model after the identifying.

2. The method of claim 1, further comprising:

generating the plurality of different data models specific to particular network elements of the plurality of network elements using management information bases (MIBs) and network element metadata.

3. The method of claim 2, wherein the MIBs define parameters that can be obtained from a corresponding network element of the plurality of network elements and the network element metadata includes data to characterize MIB parameters to be obtained from the corresponding network element for performance monitoring.

4. The method of claim 2, wherein the plurality of network elements include disparate network elements provided by different manufacturers and having different or proprietary management data interfaces, and wherein data models of the plurality of different data models are associated with network element groupings between the disparate network elements.

5. The method of claim 1, wherein one or more clusters of the plurality of clusters are associated with different performance aspect severities, and wherein a severity of the network-wide performance aspect to be monitored is identified as the severity associated with the cluster to which the feature vector is assigned.

6. The method of claim 1, further comprising:

updating the centroid of the cluster to which the feature vector is assigned as a function of the feature vector.

7. The method of claim 1, further comprising:

initializing the plurality of clusters using training data, wherein the initializing the plurality of clusters includes determining a centroid for each cluster of the plurality of clusters from a feature vector of the training data and iteratively refining the centroid using other feature vectors of the training data; and updating the centroid for each cluster of the plurality of clusters to which a feature vector of the obtained plurality of performance metrics is associated as a function of that feature vector.

8. A system comprising:

a multiple network element data extractor adapted to communicate with disparate network elements of monitored network communication infrastructure of a broadband wireless access network and obtain performance metrics therefrom using a plurality of different data models corresponding to the disparate network elements, the multiple network element data extractor being further adapted to provide at least one common data model from the performance metrics of the plurality of different data models, wherein network element-specific data of the disparate network element performance metrics is transformed into a network-wide representation, homogenized as between the plurality of different data models, adapted to support monitoring of monitored network-wide performance aspects of the monitored network communication infrastructure;

performance monitoring logic adapted to obtain performance metrics from a common data model of the at least one common data model and provide feature vectors representative of the monitored network-wide performance aspects of the monitored network communication infrastructure;

adaptive root cause analysis logic adapted to implement adaptive cluster-based analysis of feature vectors of the feature vectors representative of the monitored network-wide performance aspects and identify a root cause of the monitored network-wide performance aspects based on a distance of the feature vectors to a centroid of a cluster of a plurality of clusters, wherein the cluster represents a root cause of a network-wide performance aspect of the monitored network-wide performance aspects, and wherein the centroid of the cluster is updated using the feature vector generated from the common data model after the root cause is identified; and alarm reporting logic adapted to implement adaptive cluster-based analysis of feature vectors of the feature vectors representative of the monitored network-wide performance aspects and determine a severity of the monitored network-wide performance aspects for use in alarm reporting.

9. The system of claim 8, wherein the multiple network element data extractor comprises a data collection engine in communication with network elements of the monitored network communication infrastructure.

10. The system of claim 9, wherein the data collection engine is operable in accordance with a data collection profile of the multiple network element data extractor.

11. The system of claim 10, wherein the multiple network element data extractor further comprises a code and database generator, and wherein the data collection profile is generated by the code and database generator using management information bases and network element metadata associated with network elements of the disparate network elements.

12. The system of claim 11, wherein data models of the plurality of different data models are generated by the code and database generator using the management information bases and network element metadata associated with network elements of the disparate network elements.

13. The system of claim 9, further comprising:

a proxy based architecture including one or more proxy servers in communication with the disparate network elements and a centralized performance management server in communication with the one or more proxy servers, wherein at least a portion of the multiple network element data extractor including the data collection engine is operable upon the one or more proxy servers, and the performance monitoring logic and adaptive root cause analysis logic is operable upon the centralized performance management server.

14. The system of claim 8, wherein the disparate network elements are network elements provided by different manufacturers.

15. The system of claim 8, wherein the disparate network elements are network elements having different or proprietary management data interfaces.

16. A method comprising:

collecting network element-specific data from disparate network elements of monitored network communication infrastructure using a plurality of different data models, wherein data models of the plurality of different data models are associated with network element groupings between the disparate network elements;

generating a common data model from the network element-specific data of the plurality of different data models, wherein the generating the common data model includes transforming the network element-specific data into a network-wide generic representation adapted to support monitoring of a network-wide performance aspect of the monitored network communication infrastructure;

generating a feature vector using the common data model, wherein the feature vector represents the monitored network-wide communication performance aspect of the network infrastructure;

calculating a distance between the feature vector and a centroid of each cluster of a plurality of clusters;

assigning the feature vector to a cluster of the plurality of clusters having the centroid most near to the feature vector; and identifying at least one of a root cause of the monitored network-wide performance aspect or a severity of the monitored network-wide performance aspect from the cluster to which the feature vector is assigned, wherein the cluster represents a root cause of the network-wide performance aspect, and wherein the centroid of the cluster is updated using the feature vector generated from the common data model after the identifying.

17. The method of claim 16, further comprising:

initializing the plurality of clusters using training data, wherein the initializing the plurality of clusters includes determining the centroid for each cluster of the plurality of clusters from a feature vector of the training data and iteratively refining the centroid using other feature vectors of the training data.

* * * * *